Aug. 19, 1924. Re. 15,895
R. F. LINDSAY ET AL
AIR AGITATING TUBE FOR REFRIGERATING SYSTEMS
Original Filed Feb. 24, 1922 2 Sheets-Sheet 1
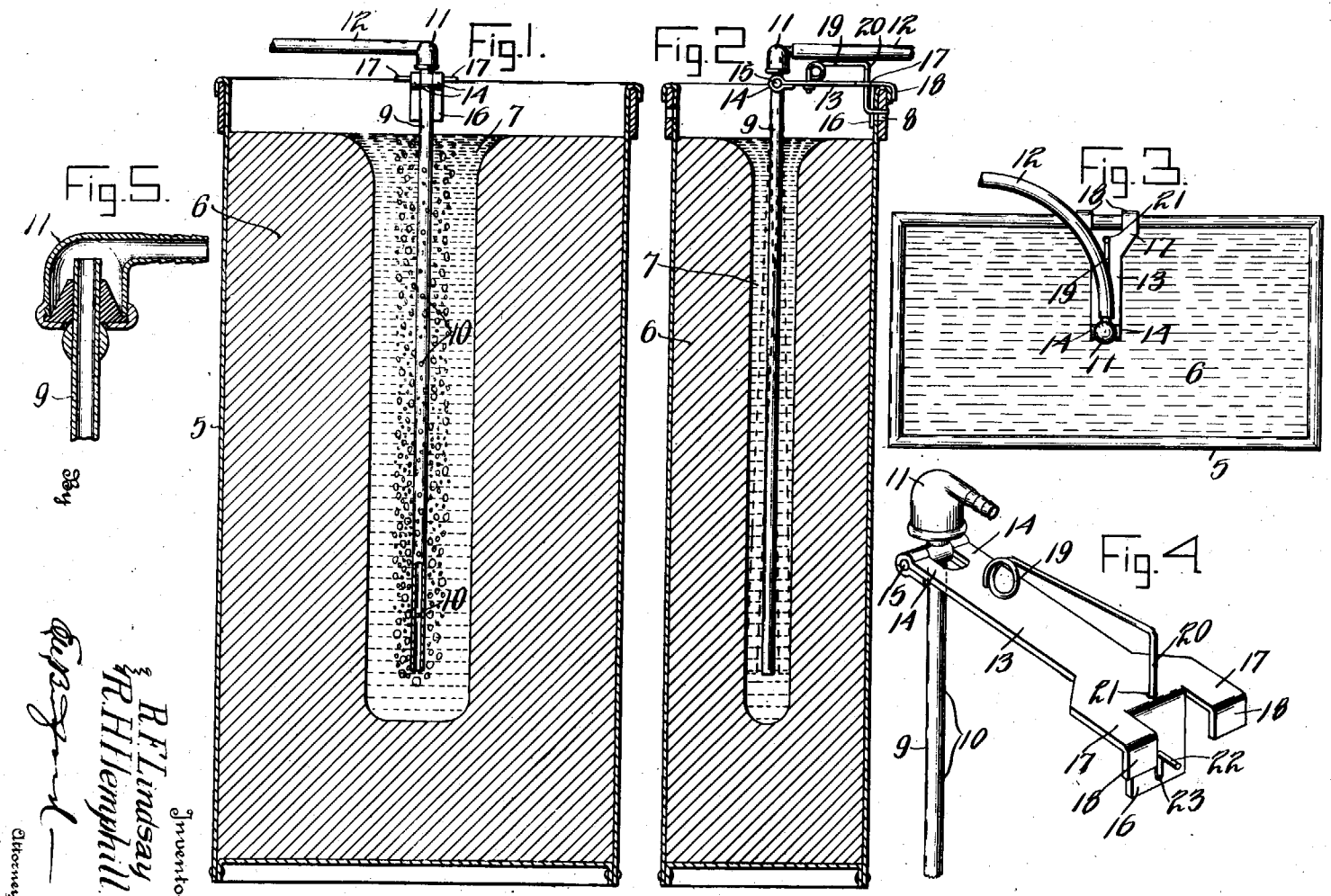
Inventors
R. F. Lindsay
R. H. Hemphill
By
Attorney Aug. 19, 1924. Re. 15,895

R. F. LINDSAY ET AL

AIR AGITATING TUBE FOR REFRIGERATING SYSTEMS

Original Filed Feb. 24, 1922 2 Sheets-Sheet 2

Inventors
R. F. Lindsay
R. H. Hemphill

By

Attorney

Reissued Aug. 19, 1924.

Re. 15,895

UNITED STATES PATENT OFFICE.

ROBERT F. LINDSAY AND ROBERT H. HEMPHILL, OF CHARLESTON, SOUTH CAROLINA, SAID LINDSAY ASSIGNOR OF HIS ENTIRE RIGHT TO THOMAS W. CARROLL, OF CHARLESTON, SOUTH CAROLINA.

AIR-AGITATING TUBE FOR REFRIGERATING SYSTEMS.

Original No. 1,442,410, dated January 16, 1923, Serial No. 538,949, filed February 24, 1922. Application for reissue filed April 24, 1924. Serial No. 708,830.

*To all whom it may concern:*

Be it known that we, ROBERT F. LINDSAY and ROBERT H. HEMPHILL, citizens of the United States, residing at Charleston, in the county of Charleston and State of South Carolina, have invented certain new and useful Improvements in Air-Agitating Tubes for Refrigerating Systems, of which the following is a specification.

This invention relates broadly to apparatus for agitating liquids by means of air, and specifically to means to be employed in low pressure systems for agitating the unfrozen core in an ice can so as to remove the impurities and provide for the production of clear, colorless ice.

An object of the invention is to provide means for supporting an air agitating tube in an ice can so that the tube maintains its position in the unfrozen core water until the ice cake is completely frozen.

Another object is to provide a support for carrying the air agitating tube which is readily attached to or detached from the top of an ice can of ordinary construction.

The invention is employed in connection with ice cans which are oblong in horizontal cross section the tube being suspended in the can by means of a hanging device which permits lateral oscillation across the smaller diameter of the can but holds the pipe rigidly relative to the greater diameter of the can. In other words the device is attached to the tube in such a manner that the tube may swing freely to and fro in one plane and is restrained from motion in any other plane.

Referring to the accompanying drawing which is made a part hereof and on which similar reference characters indicate similar parts, Figure 1 is a vertical longitudinal section taken through the greater diameter of the ice can, showing the improved air agitating device in position, Figure 2 is a similar view, the section being at right angles to Figure 1;

Figure 3 is a top plan view of the can and agitator;

Figure 4 is a perspective view of the tube support and the upper end of the tube;

Figure 5 is a detail sectional view of the metallic fitting at the top of the tube.

Figure 6:
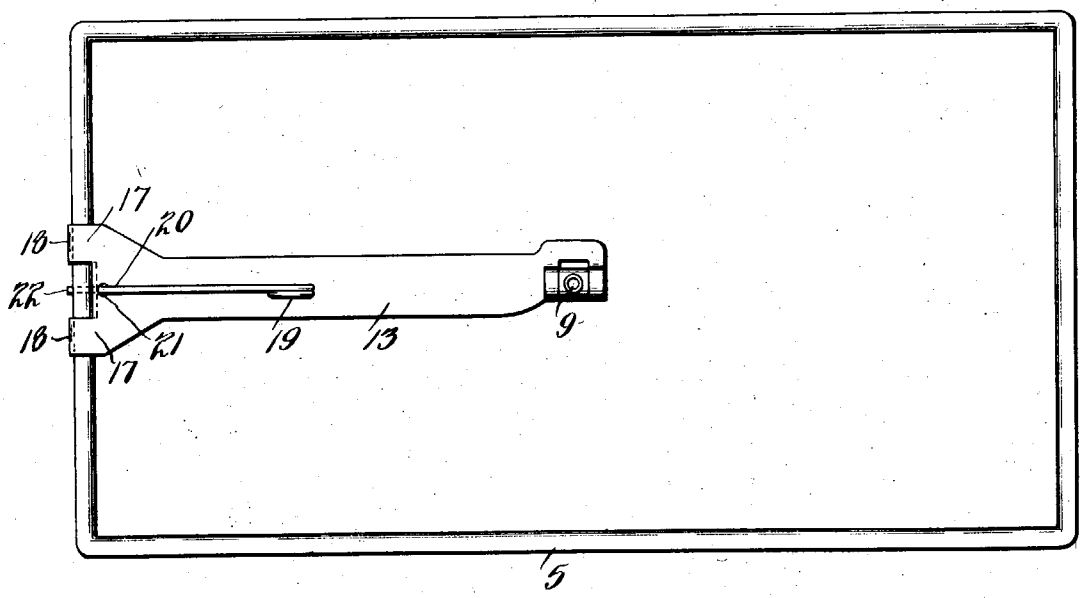
Figure 6 is a view of a modified form of tube support designed for attachment to the short side of top of the ice can.

In the drawing, there is shown a standard ice can 5 of any desirable construction, within which is shown (Figs. 1 and 2) an incompletely frozen cake of ice 6 having the unfrozen central core 7. The can is oblong in horizontal cross section and this is preferred. The top of the can 5 has holes 8 in its long sides designed primarily to permit the attachment of a lifting device so that when the ice has been completely frozen, the can may be removed from the cold brine in the freezing tank. We preferably use one of these holes to provide a point of attachment for the tube supporting means to be described, but other holes may obviously be provided in either the long or short sides of the can.

In order to agitate the water during the freezing process so as to prevent the freezing in of impurities contained in the water, a tube 9 is supported pendently from the top of the can by means which forms a part of the present invention. This tube has a number of small perforations 10 at intervals along its length and is open at the bottom. The air under low pressure is led from a pipe 12 connected to a fitting 11, which is detachably connected to the upper end of the tube 9, and the air escapes through perforations 10 as well as through the lower open end of the tube.

A support 13, which is preferably stamped from sheet metal, is bifurcated at one end, and the furcations 14 are bent or doubled upon themselves to provide bearings for pintles 15 projecting from tube 9 near its upper end. Any other equivalent means may be employed instead to connect the support 13 with the tube 9, so that the tube may swing in a plane across the smaller diameter of the can, and depend from the support in a position normally at right angles thereto. The important feature is that the support should be attached to the tube in such a manner that the tube may swing freely to and fro in one plane and be restrained from motion in any other plane. The means described is to be taken merely by way of example.

The other end of support 13 preferably is wider than the pivotally connected end (see Fig. 4) and has a depending arm 16 bent at right angles thereto. The arm 16 is of less width than the corresponding end of support 13, so that two lugs 17 are provided on each side of the arm 16, after the latter is bent down. Each lug 17 is also bent at right angles to provide a pair of flat projections 18 spaced from but parallel to the arm 16. A wire spring 19 having a coil at its inner end, where it is fastened by a nut to the support at one side of the tube, is carried by the support and extends toward the wide end of the support, being then bent downwardly as at 20 and passed through a hole 21 in the support. The extremity 22 of the spring is bent a second time so as to be nearly parallel to the support 13, and extends through a slot 23 provided in the arm 16. The spring may be depressed for a distance equal to the length of slot 23, but it always tends to move to the top of the slot, or in other words toward the lugs 17. This connection provides a spring clamping means between the support and the ice can.

When the tube support is to be mounted on the ice can, the spring 19 is pressed as far down as possible, whereupon the extremity 22 is partly withdrawn through the slot, and the arm 16 and projections 18 may be disposed on opposite sides of the upper edge of the ice can adjacent one hole 8. If the spring is now released, its end 22 will pass into the hole 8 as seen in Figure 2, and by its resilience will hold the support on the top of the can.

When the ice cake or block is frozen, and it is desired to remove the agitating tube from the cake of ice, the fitting 11 is detached from the tube 9, and then a hot water needle is inserted in the tube which warms the latter so that the tube may be detached from the ice cake or block. Then the spring is depressed and detached from the hole 8 of the can, and the tube raised out of the can.

It will be obvious that clamping means other than the described means could be used to hold the end of the support on the top of the can so as to project inwardly on a level with the top of the can. The means employed should, however, permit the tube to be attached and detached easily and rapidly.

The present invention is designed particularly, though not exclusively, for use in connection with a low pressure air agitating system, which, as is well known, offers important advantages over the high pressure system. However, in order to make the low pressure system effective, the agitator tube must be at all times suspended in the center of the ice cake and must be maintained spaced from the surface of the freezing ice; otherwise it will be frozen in before the entire core is frozen, with the result that the agitation of the core water will cease. When such agitation stops, the impurities in the core water will rapidly settle and adhere to the surface of the adjacent ice and will be imprisoned by further solidification of the core water, and the purity as well as the market value of the ice, will be greatly impaired. The tube supporting means herein disclosed and the discharge of air from the sides and bottom of the tube together give rise to a circulation of the core water and a slight oscillation of the tube end, the same as a pendulum, as seen in Figure 2, so that the tube is kept away from the approaching freezing surfaces of the ice until the core is so small that the tube becomes imprisoned on both sides at the same time. This is true even though the tube should hang out of plumb, or even though the can be tilted at a considerable angle with respect to the vertical. In effect, the tube is self-centering, and is kept in the unfrozen core water until the ice cake is frozen. The small perforations in the side of the tube continue to agitate the water until they are successively closed by the freezing of the ice cake. Good results may be obtained with only the open lower end of the tube.

In Figures 1, 2 and 3 the agitating device is attached to one of the long sides of the can, while in Figure 6 it is shown connected to one of the short sides. The result is the same in either case.

Having thus fully described our said invention, what we claim as new and desire to secure by Letters Patent is:

1. A supporting device for agitator tubes for ice cans, having means at one end for detachable engagement with the ice can, and having means at the other end for pivotally connecting the upper end of the tube thereto.

2. A support for air agitator tubes for ice cans, having means for detachable engagement with the ice can, and also having means for swingingly connecting the tube to the support so that the tube hangs pendently from the support and may swing freely to and fro in one plane and is restrained from motion in any other plane.

3. A means for supporting air agitator tubes for ice cans, comprising a support connected with the tube at one end of the support, and means on the other end of the support whereby the support may be secured to the top of the can and will project inwardly to the center of the can substantially on a level with the top of the can, and a pivotal connection at said other end between the tube support and the tube.

4. A means for supporting air agitator tubes for ice cans, comprising a support on which the tube is bodily and freely swingable and having a hinge connection with the tube and having a spring clamp at one end whereby it is mountable on the top of the ice can.

5. A means for supporting air agitator tubes for ice cans, comprising a support having a pivotal connection with the tube, means whereby an end of the support may be seated on the top edge of the can so as to project substantially horizontally on a level with the top of the can, and a clamp mounted on said support and cooperating with the can to hold the support in the stated position.

6. A means for supporting air agitating tubes for ice cans, comprising a support having a depending arm at one end and a pair of lugs spaced from the depending arm so that the upper edge of the can is receivable in the space between said parts, and spring-impelled means movable toward the lugs so that the support may be removably held on the can.

7. A means for supporting air agitating tubes for ice cans, comprising a support pivotally connected at one end to the tube, and means at the other end whereby the support is secured to the can, said means engaging with the hole usually provided at the tops of ice cans for the purpose of permitting the attachment of lifting devices.

8. A means for supporting air agitating tubes for ice cans, comprising a support having a depending arm at one end and lugs spaced from but parallel to said depending arm so that the upper edge of the can is receivable in said space, a spring mounted on the support with one end extending through a slot in the depending arm whereby the spring end is constrained to move toward the lugs so that the support is clamped on the can, and means joining the other end of the support with the tube.

9. The combination with an ice can and an air agitator tube therefor, of a support for the tube adapted to be mounted on the can, said tube being constructed of metal and pivoted to the support to swing in one vertical plane only, said tube having an open lower end whereby the escape of air from said end and the resultant agitation of the water in the can, will set up oscillations on the part of the tube, which oscillations prevent premature freezing of the tubes before the entire core is frozen.

10. The combination with an ice can and an agitator tube therefor, of a support for the tube adapted to be mounted on the can, said tube being pivoted to the support to swing in but one plane, said tube having an open lower end and a plurality of perforations extending longitudinally whereby the escape of air from said perforations and said open end and the resultant agitation of the water in the can, will set up oscillation on the part of the tube, which oscillation prevents premature freezing in the tube before the entire core is frozen.

11. An air-agitating device for ice cans comprising a support, means for positioning said support temporarily on the ice can, and an air-agitator tube provided with means for connection with an air supply and connected to said support by a hinge connection whereby said tube is adapted to swing bodily on said support, substantially as set forth.

12. The combination of an air agitator tube for ice cans, a support on which the tube is bodily swingable in a plane extending transversely of the can, means for opposing movement of the tube away from said plane, and means to secure the support detachably to an ice can, substantially as set forth.

13. An air-agitating attachment for ice cans comprising a support, means for detachably securing said support to an ice can, an air-agitator tube, and a hinge connection between said air-agitator tube and said support whereby said tube is adapted to swing bodily crosswise of said can, substantially as set forth.

14. A support for air agitating tubes for ice cans, including means for detachable engagement with the wall of an ice can, and means for swingingly connecting the tube to the support for swinging movement in a single plane only during the freezing operation.

15. Mechanism for making ice comprising an ice can, an air agitator tube extending into the can, and means for supporting the tube for pivotal movement in one plane only said means supporting the tube so loosely that the normal pressure of the air escaping into the water of the can causes the tube to swing, substantially at set forth.

16. In a refrigerating system, an ice can, an air agitator tube extending into the can, and means whereby the tube is so loosely supported that the normal pressure of the air escaping into the water of the can causes the tube to oscillate such oscillation being limited to a single plane, substantially as set forth.

17. In a refrigerating system, an ice can, an air agitator tube extending into the can having perforations along opposite sides, and means whereby the tube is so loosely supported that the normal pressure of the air escaping into the water of the can causes the tube to oscillate in a plane passing approximately through such perforations said means limiting such oscillation to said plane, substantially as set forth.

18. A supporting device for air agitator tubes for oblong ice cans having means to support the tube so loosely that the normal pressure of the air escaping into the water of the can causes the tube to swing said means limiting such movement to a single plane extending transversely of the longer diameter of the can, substantially as set forth.

19. In a refrigerating system, an ice can, a support for an air agitator tube including a horizontal pivot, an air agitator tube mounted to swing freely on said pivot, and an air supply connected to said tube for supplying air thereto under pressure whereby said tube has a swinging impulse imparted thereto by the discharge of air therefrom, substantially as set forth.

In witness whereof, we have hereunto set our hands and seal at Charleston, South Carolina this 16th day of April, A. D. nineteen hundred and twenty-four.

ROBERT F. LINDSAY.
ROBERT H. HEMPHILL.

Witnesses:
J. H. ARMNSTRONG,
J. G. HUFF.